United States Patent
Bricker (10) Patent No.: US 7,765,073 B2
(45) Date of Patent: Jul. 27, 2010

(54) AUTOMATED CRACK DETECTION SYSTEM AND METHOD FOR VEHICLE CLOSURE

(75) Inventor: David W. Bricker, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 12/025,438

(22) Filed: Feb. 4, 2008

(65) Prior Publication Data

US 2009/0198455 A1 Aug. 6, 2009

(51) Int. Cl.
*G01B 3/44* (2006.01)
*G01D 7/00* (2006.01)

(52) U.S. Cl. .......................... 702/34; 73/587

(58) Field of Classification Search ............. 702/33–36, 702/39, 41–43, 56–59, 66–67, 70–77, 81, 702/84, 141, 182–183, 188–190, 108, 113, 702/127, 138–139, 185; 296/146.1, 187.01, 296/187.03; 73/570, 577, 584, 587–588, 73/645, 12.01, 86–87, 783

See application file for complete search history.

(56) References Cited

U.S. PATENT DOCUMENTS

| | | | |
|---|---|---|---|
| 3,713,127 A * | 1/1973 | Keledy et al. ............... 340/540 |
| 4,346,914 A * | 8/1982 | Livers et al. ................ 280/735 |
| 4,480,480 A * | 11/1984 | Scott et al. .................... 73/769 |
| 5,144,838 A | 9/1992 | Tsuboi |
| 6,778,894 B2 | 8/2004 | Beck et al. |
| 7,075,424 B1 | 7/2006 | Sundaresan et al. |
| 7,082,359 B2 * | 7/2006 | Breed ........................... 701/36 |
| 7,379,845 B2 * | 5/2008 | Gorinevsky et al. ......... 702/184 |
| 7,397,421 B2 * | 7/2008 | Smith .......................... 342/192 |
| 2005/0068041 A1 | 3/2005 | Kress et al. |
| 2005/0273277 A1 | 12/2005 | Ridnour et al. |
| 2006/0069520 A1 | 3/2006 | Gorinevsky et al. |

FOREIGN PATENT DOCUMENTS

JP 04-089546 3/1992

(Continued)

OTHER PUBLICATIONS

Musser et al., Application of Transient SEA for Vehicle Door Closure Sound Quality, May 16-19, 2005, SAE 2005 Noise and Vibration Conference and Exhibition.*

(Continued)

*Primary Examiner*—Michael P. Nghiem
*Assistant Examiner*—Toan M Le
(74) *Attorney, Agent, or Firm*—Mark E. Duell; Rankin, Hill & Clark LLP (57) ABSTRACT

An automated crack detection system and method for determining a crack initiation potential of a vehicle closure includes a vehicle closure operatively mounted to a vehicle. One or more specific locations on the vehicle closure are identified for monitoring and one or more sensors are mounted on the vehicle closure at the one or more specific locations identified. A signal analyzer assembly is linked to the one or more sensors for receiving acoustic emission signals therefrom when the vehicle closure is repeatedly opened and closed. The signal analyzer assembly compares the signals received to a predetermined threshold to determine a crack initiation potential of said vehicle closure.

27 Claims, 4 Drawing Sheets

FOREIGN PATENT DOCUMENTS

| KR | 100149816 B1 | 6/1998 |
| KR | 1020040031184 A | 4/2004 |
| WO | WO 2004037700 A1 * | 5/2004 |

OTHER PUBLICATIONS

McDowell et al., Integrated Diagnostic/Prognostic Tools for Small Cracks in Structures, 2000, Proceedings of the Institution of Mechanical Engineers, vol. 214, Part C, pp. 1123-1140.*

Victor Giurgiutiu and Yuh Jin Chao, "Adaptive Heath Monitoring and Damage Detection of Spot-Welded Structural Joints," University of South Carolina (1997).

Mark M. Carlos, "Acoustic Emission, Heeding the Warning Sounds from Materials," Physical Acoustics Corporation (2003).

Brian M. Gero, "Acousto-Ultrasonic Evaluation of Cyclic Fatigue of Spot Welded Structures," Master's Thesis, Virginia Polytechnic Institute and State University (1997).

Victor Giurgiutiu, Yuh Chao, Buli Xu and Rishi Gaddam, Embedded Smart Sensors for Monitoring Crack Presence and Growth under Cyclic Fatigue Loading, University of South Carloina.

G. Wang and M.E. Barkey, "Fatigue Cracking and its Influence on Dynamic Response Characteristics of Spot Welded Specimens," Society for Experimental Mechanics, vol. 44, No. 5, pp. 512-521 (Oct. 2004).

* cited by examiner

AUTOMATED CRACK DETECTION SYSTEM AND METHOD FOR VEHICLE CLOSURE

BACKGROUND

The present disclosure generally relates to an automated crack detection system and method for a vehicle closure and more particularly relates to an automated crack detection system and method that monitors acoustic emissions during an open and close durability test of the vehicle closure for determining a crack initiation potential of a vehicle closure.

It is known to monitor critical areas of a vehicle closure, such as a door, tailgate or the like, for fatigue failures occurring during repeated opening and closing (i.e., durability testing) of the vehicle closure. Fatigue failure can be determined by the appearance of a crack in the vehicle closure and the durability of the vehicle closure can be measured by counting the number of repeated openings and closing of the vehicle closure prior to the appearance of the crack. Thus, for example, a vehicle closure can be said to fail due to fatigue when a crack appears after a number of closings of the vehicle closure.

The current method for finding a crack in the vehicle closure requires invasive physical checks to be performed on the vehicle closure. For example, a vehicle closure undergoing durability testing may have to be removed from the vehicle to which it was mounted and/or cut open (i.e., undergo a teardown) to search for cracks which likely prevents reuse of the vehicle closure. This is a cumbersome process that is time consuming and expensive. There are also difficulties associated with determining precisely when or after how many openings and closings (i.e., cycles) to perform a crack check.

Moreover, any cracks forming in the vehicle closure must typically propagate to a considerable size before they can be detected under current durability testing and monitoring methods. As a result, it is often difficult to determine when a crack first forms in the vehicle closure and information concerning propagation of the crack immediately after initial formation is generally unavailable. Oftentimes, multiple durability tests are performed on several vehicle closures of a common design so the vehicle closures can be removed and/or cut open at varying stages of the durability test in an attempt to more accurately determine when crack formation begins. This causes further labor and material costs to be incurred during durability testing of vehicle closures. Accurately determining the timing of crack initiation during a durability test is also important to improve the correlation of physical tests with Computer Aided Engineering (CAE) simulations. Improved simulation accuracy can reduce the dependence on prototype testing, and thereby reduce the cost of the development of vehicle closure systems.

SUMMARY

According to one aspect, a method is provided for monitoring one or more specific locations of a vehicle closure for fatigue failure occurring during opening and closing of the vehicle closure. More particularly, in accordance with this aspect, the method comprises identifying one or more specific locations on a vehicle closure to be monitored; mounting a sensor at each of the one or more specific locations on the vehicle closure; repeatedly opening and closing the vehicle closure with the sensor mounted at each of the one or more specific locations on the vehicle closure; and comparing acoustic emission generated during repeated opening and closing of the vehicle closure to a predetermined threshold to determine a crack initiation status of the vehicle closure.

According to another aspect, a method is provided for determining fatigue failure in a vehicle closure. More particularly, in accordance with this aspect, the method comprises identifying at least one high risk location in a vehicle closure; positioning at least one sensor on the vehicle closure at each one of the at least one high risk location; generating acoustic emission by repeatedly closing the vehicle closure; collecting the acoustic emission generated for each closing impact of the vehicle closure through the at least one sensor; and comparing the acoustic emission collected to a predetermined threshold to determine a crack initiation potential of said vehicle closure.

According to yet another aspect, a method is provided for monitoring one or more specific locations on a vehicle closure during opening and closing of the vehicle closure. More particularly, in accordance with this aspect, the method comprises identifying one or more specific locations on a vehicle closure to be monitored; mounting a sensor at each of the one or more specific locations on the vehicle closure; repeatedly opening and closing the vehicle closure with the sensor mounted at each of the one or more specific locations on the vehicle closure; and monitoring local vibrations sensed by the sensor mounted at each of the one or more specific locations for a measurable increase evidencing crack initiation and/or propagation in the vehicle closure.

According to still another aspect, an automated crack detection system is provided for determining a crack initiation potential of a vehicle closure. More particularly, in accordance with this aspect, the system comprises a vehicle closure operatively mounted to a vehicle and one or more sensors positioned on the vehicle closure at one or more specific locations for monitoring acoustic emissions of the vehicle closure during closure thereof. A signal analyzer assembly is linked to each of the one or more sensors for receiving acoustic emission signals from the one or more sensors and comparing the signals received from the one or more sensors to a predetermined threshold to determine a crack initiation potential of the vehicle closure.

DETAILED DESCRIPTION

Figure 1:
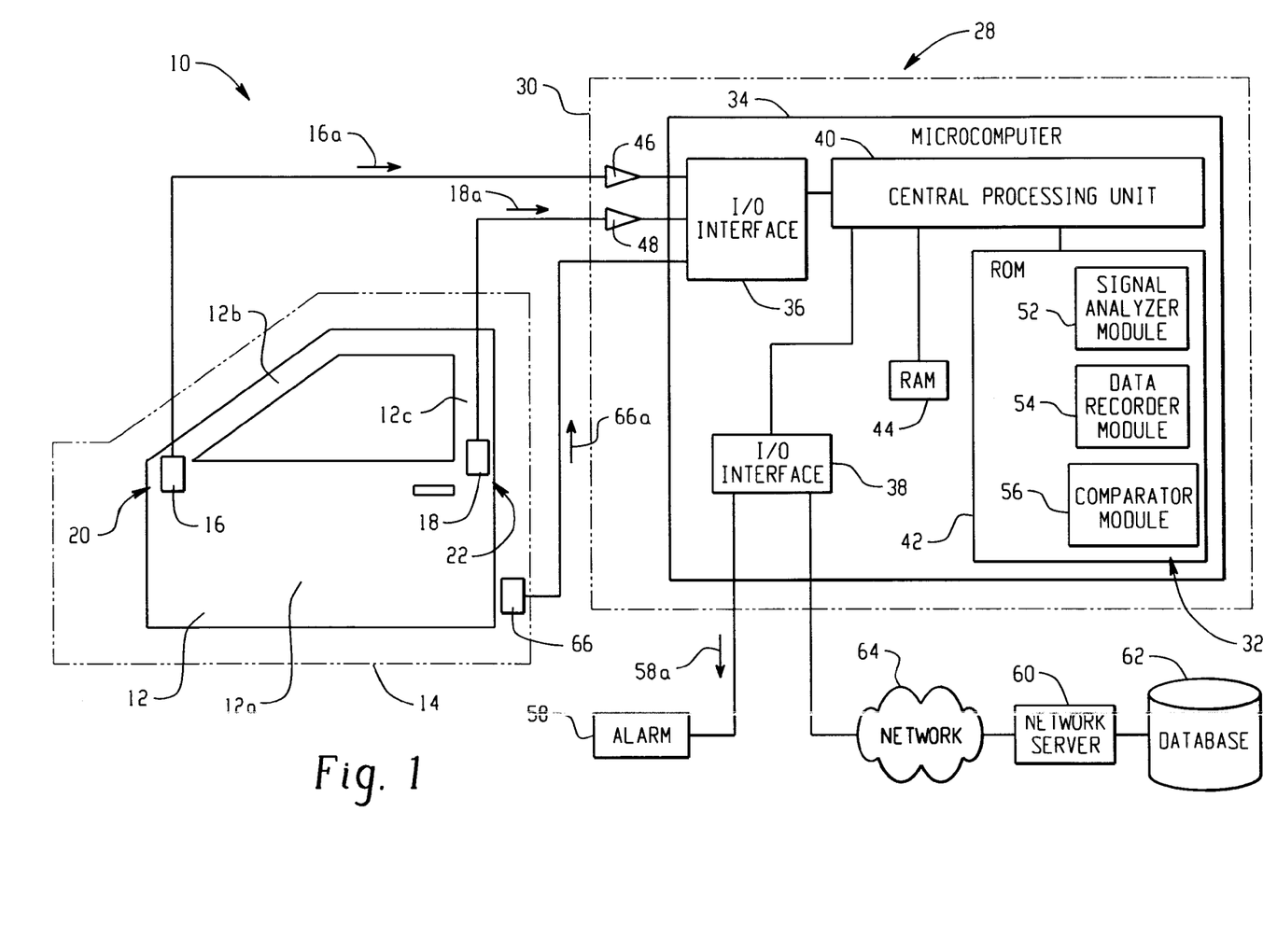
FIG. 1 is a schematic view of an automated crack detection system for determining a crack initiation potential of a vehicle closure.

Referring now to the drawings, wherein the showings are for purposes of illustrating one or more exemplary embodiments, FIG. 1 shows an automated crack detection system 10 for determining a crack initiation potential of a vehicle closure 12. More particularly, as will be described in further detail below, the system 10 can be used for monitoring one or more specific or high risk locations of the vehicle closure 12 for fatigue failure occurring during opening and closing of the vehicle closure 12, such as during a vehicle closure durability test. In the illustrated embodiment, the vehicle closure 12 is depicted schematically as a vehicle passenger cabin entry door operatively mounted to vehicle 14, but it is to be appreciated by those skilled in the art that the system 10 can be used on any vehicle closure operatively mounted to a vehicle, including for example tailgates, glove compartment doors, console doors, trunk lids, hoods, etc.

The system 10 includes one or more sensors positioned on the vehicle closure 12 at one or more specific locations which can monitor the vehicle closure 12 for fatigue during repeated closure thereof. In particular, the illustrated system 10 includes two crack initiation monitoring or crack initiation sensors 16,18, particularly first sensor 16 mounted at first location 20 on the vehicle closure 12 and second sensor 18 mounted at a second location 22 on the vehicle closure 12. Of course, while the depicted system 10 is shown with two crack initiation sensors 16,18, it is to be appreciated by those skilled in the art that the system 10 can have any number of crack initiation sensors positioned or mounted at any number of locations on the vehicle closure 12.

The crack initiation sensors 16,18 can be acoustic emission sensors for detecting a level of acoustic emission at the respective locations 20,22 during repeated opening and closing of the vehicle closure 12. In particular, the sensors 16,18 can be high-frequency acoustic emission sensors capable of capturing high frequency vibrations in the closure 12 between, or in the range of, about 1 KHz to about 2 MHz or greater. One type of sensor capable of capturing such high-frequency acoustic emission is an acoustic emission sensor (e.g., a piezoelectric, piezopolymer, fiber-optic, MEMS or other known or commercially available sensor types). The sensors 16,18 are further capable of generating and sending electronic signals representative of the acoustic emission captured. For example, the sensors 16,18 can send signals 16a, 18a, depicted schematically, that represent the acoustic emission captured, detected, and/or sensed by the sensors.

The system 10 can further include a signal analyzer assembly 28 linked to the crack initiation sensors 16,18. As will be described in more detail below, the signal analyzer assembly 28 is linked to the sensors 16,18 for receiving acoustic emission signals therefrom and comparing the signals received to a predetermined threshold to determine the crack initiation potential of the vehicle closure. As used herein, a link or being linked is used broadly to cover any operative connection between components of the system 10 whether wired or wireless that enables the linked components to communicate (e.g., transmit a signal from one component to another).

In particular, the signal analyzer assembly 28 includes condition monitoring hardware 30 and condition monitoring software 32. As is known and understood by those skilled in the art, the hardware 30 can include a microcomputer 34 comprised of one or more input/output interfaces, such as first input/output interface 36 and second input/output interface 38 shown schematically in FIG. 1, a CPU or central processing unit 40, a ROM 42 for storing various operation programs or modules (i.e., software) to be executed by the CPU 40 and a RAM 44 for temporarily storing the results of computations or the like by the CPU 40. As illustrated, the first interface 36 can be operatively connected (e.g., linked) to the sensors 16,18 for receiving acoustic emission signals therefrom, such as signals 16a,18a. The hardware 30 can further include one or more conditioning filters, such as first conditioning filter 46 and second conditioning filter 48 shown schematically in FIG. 1, for processing and conditioning the acoustic emission signals sent by the sensors 16,18. As used herein, any one or more of the signal analyzer assembly 28, the conditioning monitoring hardware 30, and the microcomputer 34 can be referred to a signal analyzer.

The conditioning monitoring software 32, which can be run by the microcomputer 34, can include a FFT (Fast Fourier Transform) analyzer or other signal analyzer module 52 for generating an FFT spectrum or time history from the acoustic emission signals 16a,18a sent by the sensors 16,18 and passed through the filters 46,48, a data recorder module 54 for storing information related to the generated FFT spectrum or time history, and/or a comparator module 56 for comparing the generated FFT spectrum or time history to a predetermined threshold. The modules 52,54,56 can be contained in one or any number of software applications or programs and need not be stored in whole or in part on the ROM 42 as depicted in FIG. 1. The particular system 10 depicted in FIG. 1 is but one exemplary embodiment of an automated crack detection system for determining a crack initiation potential of a vehicle closure.

As will be described in more detail below, the signal analyzer assembly 28 can, through the conditioning monitoring software 32 and the analyzer module 52, compare an amplitude of the signals 16a,18a post-filtering to the predetermined threshold to determine the crack initiation potential of the vehicle closure 12. More particularly, the analyzer assembly 28 and software 32 (including the analyzer module 52) can generate a FFT spectrum or time history from the filtered signals 16a,18a and compare the generated FFT spectrum or time history, or an amplitude thereof, to the predetermined threshold to determine the crack initiation potential of the vehicle closure 12. The system 10 can include an alarm 58 connected to the microcomputer 34 through the second interface 38 that is actuated (via signal 58a being sent to the alarm) when the acoustic emission signals 16a,18a indicate that the acoustic emissions being sensed by the sensors 16,128 exceed the predetermined threshold (i.e., the FFT spectrum or time history amplitude exceeds the predetermined threshold).

The system 10 can include a data recorder for storing information related to the signals 16a, 18a or, more particularly, the FFT spectrum or time history generated by the signal analyzer assembly 28. In the illustrated embodiment of FIG. 1, the data recorder can be a remotely positioned network server 60 and database 62. As is known and understood by those skilled in the art, the network server 60 and database 62 can be linked to the microcomputer 34, particularly interface 38 of the microcomputer shown in FIG. 1, through a network 64, such as the Internet or any other network (e.g., an intranet). Alternatively, the data recorder could be some other device or could simply be the ROM 42.

In addition, the system 10 can include any number of additional sensors for sensing appropriate signals to the signal analyzer assembly 28 about other conditions of the vehicle closure 12 and/or the durability test. For example, sensor 66 can be mounted adjacent the vehicle closure, i.e., for sensing closure of the door 12. In this arrangement, the sensor 66 functions as a count or cycle sensor and sends a signal or signals 66a to the signal analyzer assembly 28 for purposes of tracking the count or cycles at closing the door 12 in a particular durability test.

Figure 2:
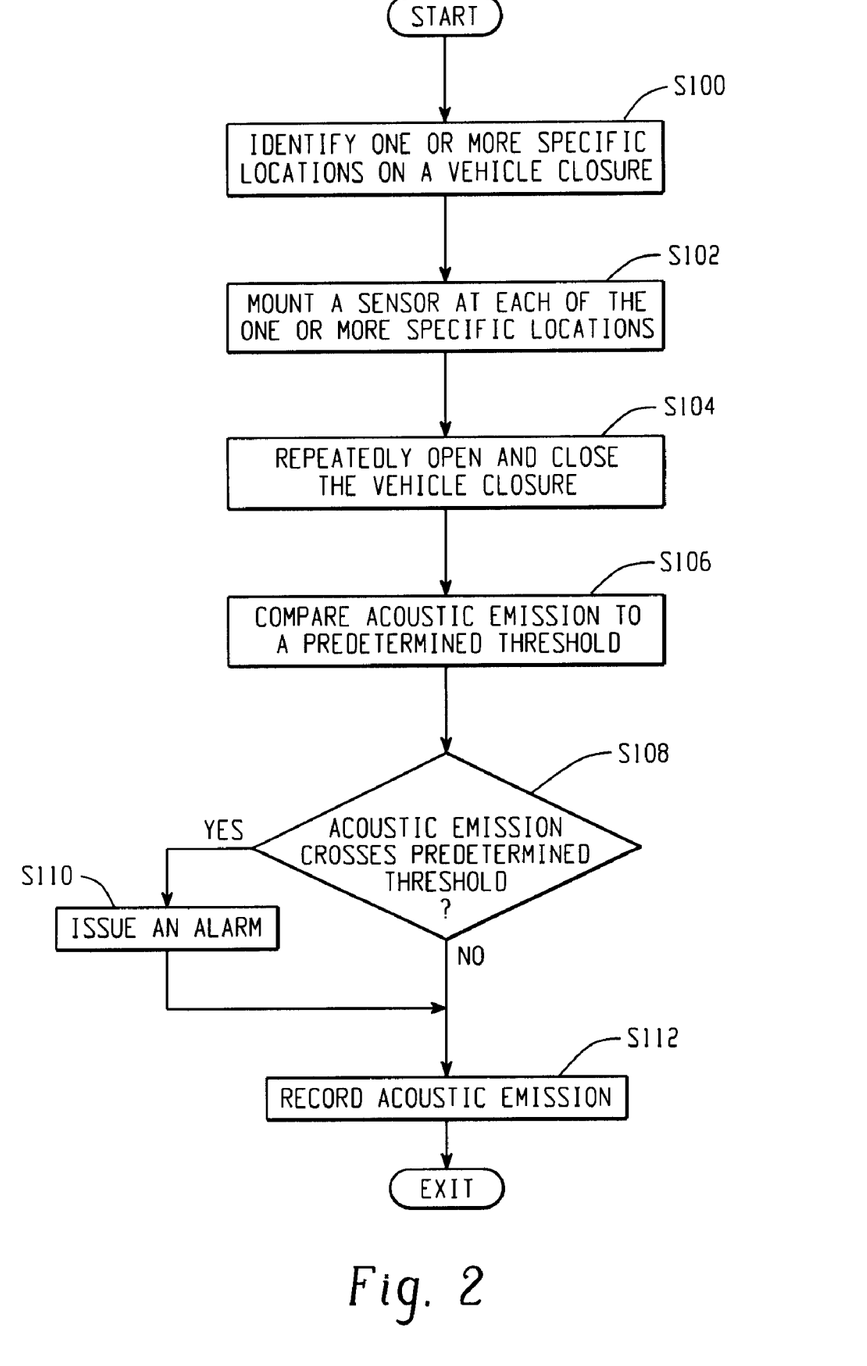
FIG. 2 is block diagram illustrating a method for monitoring the vehicle closure for fatigue failure occurring during opening and closing (i.e., durability testing) of the vehicle closure.

With additional reference to FIG. 2, a method is shown for monitoring a vehicle closure, particularly one or more specific locations of the vehicle closure, for fatigue failure occurring during opening and closing of the vehicle closure. When applied to the system 10 shown in FIG. 1, the method can be used to monitor the locations 20,22 of the vehicle closure 12 for fatigue failure (i.e., cracking or crack initiation). According to the method, one or more specific locations of interest (e.g., high risk locations or locations deemed to be more susceptible to cracking or crack initiation) are identified on the vehicle closure 12 that is to be monitored (S100). This can include completing a computer aided engineering (CAE) evaluation of the vehicle closure 12 to identify specific locations of interest or high risk locations. Alternatively, identifying of one or more locations can be done in some other manner or can simply be based on prior knowledge and/or experience (such as obtained during earlier durability tests) concerning where a particular vehicle closure is more likely to fail. On the passenger door 12 shown in FIG. 1, the one or more specific or high risk locations identified include the first location 20, which is a connection area of the door 12 between a door main body portion 12*a* and a forward window frame portion 12*b*, and the second location 22, which is a connection area of the door 12 between the main body portion 12*a* and a rearward window frame portion 12*c*.

Once the one or more locations on the vehicle closure have been identified, at least one crack initiation sensor can be positioned on the vehicle closure at each one of the locations identified (S102). That is, a sensor can be mounted at each of the identified locations on the vehicle closure (S102). On the vehicle door 12 in FIG. 1, the sensor 16 is positioned or mounted at the first location 20 and the sensor 18 is positioned or mounted at the second location 22, both locations 20,22 being identified as specific locations of interest or high risk locations. After the one or more sensors are mounted at each of the one or more specific or high risk locations, the vehicle closure, such as door 12, can be repeatedly opened and closed (i.e., durability testing) (S104).

Each occurrence of the vehicle closure being opening and closed can be considered one (1) cycle in the durability testing and the closing or closing impact in each cycle generates local vibrations and measurable acoustic emission in the vehicle closure. As will be described in more detail below, the local vibrations can be sensed by the sensors mounted on the vehicle closure (e.g., sensors 16,18 mounted on door 12) and then monitored for a measurable increase evidencing crack initiation and/or propagation in the vehicle closure. (e.g., is/has a crack formed, is a formed crack propagating, etc.). The acoustic emission or local vibrations generated during the repeated opening and closing of the vehicle closure can be compared to a predetermined threshold to determine a crack initiation potential or status of the vehicle closure (S106).

Should the acoustic energy or local vibrations cross (or reach or exceed) the predetermined threshold (S108), an alarm can be issued (S110). If desirable, whether or not an alarm was issued, the acoustic emission energy generated and sensed during the durability test can be recorded (S112). In the system 10 of FIG. 1, the signal analyzer assembly 28 compares the acoustic emission energy generated by repeated opening and closing of the door 12 to a predetermined threshold to determine a crack initiation potential or status of the door 12, particularly at the two locations of interest 20,22. Should the threshold be reached or exceeded, the signal analyzer assembly 28 can actuate the alarm 58. Recording of the acoustic emission energy in the system 10 can be done on the server 60 and database 62, on the ROM 42 or through some other means.

Figure 3:
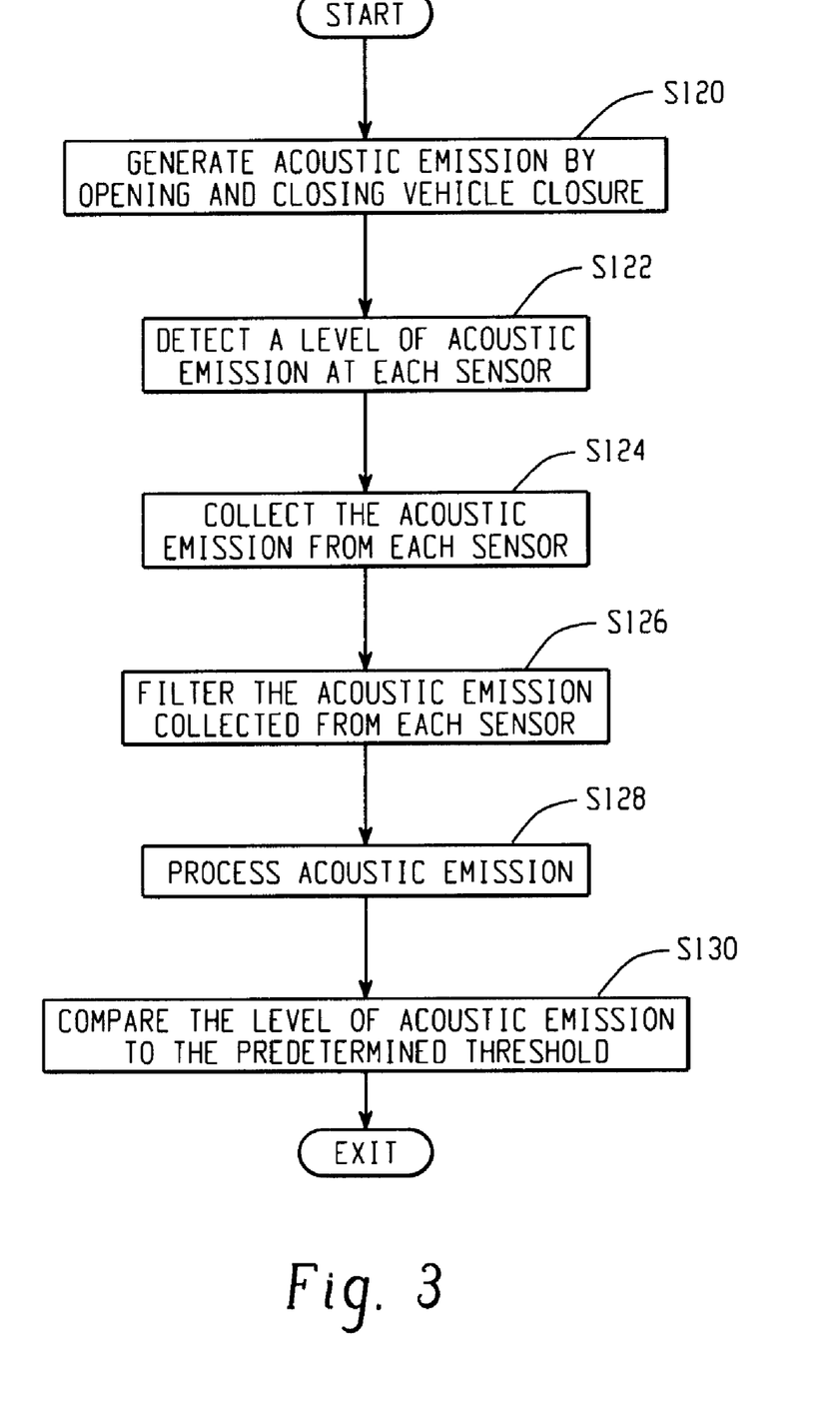
FIG. 3 is a block diagram illustrating a process for collecting and processing acoustic emission generated during opening and closing of the vehicle closure and comparing the acoustic emission to a predetermined threshold.

With additional reference to FIG. 3, a method is shown for collecting and processing the acoustic emission generated during opening and closing of a vehicle closure and comparing the same to a predetermined threshold (S104 and S106 in FIG. 2). As mentioned above, the repeated opening and closing of the vehicle closure at S104 includes generating acoustic emission during each closing impact of the vehicle closure (S120). Accordingly, each time the door 12 of system 10 is closed during an open/close durability test, measurable acoustic emission is generated. Each of the sensors mounted on the vehicle closure can senses or detect a level, particular to each sensor, of the generated acoustic emission (S122). Thus, on door 12 each of the sensors 16,18 can detect or sense a particular level of acoustic emission generated by the repeated closures of the door 12.

With continued reference to FIG. 3, the level of acoustic emission energy generated for each closing impact of the vehicle closure and detected by each sensor can be collected through the one or more sensors (S124). More particularly, detecting the level of acoustic emission generated and collecting the same includes having each sensor generate a signal or signals representative of the level of acoustic emission sensed by that sensor and routing the signal or signals generated to a signal analyzer. For example, each sensor can continuously detect a level of acoustic emission generated by or through the vehicle closure, generate a signal or signals representative of the detected level, and forward or route the generated signal or signals to the signal analyzer. As will be understood and appreciated by those skilled in the art, continuous detection, generation, and routing can be done by repeatedly sampling the generated acoustic emission at a sampling rate over a period of time. In FIG. 1, collection of the acoustic emission generated by the repeated closures of the door 12 is done through the crack initiation sensors 16,18. In particular, the sensors 16,18 each detect a level of acoustic emission generated, generate a signal or signals representative of the detected level of acoustic emission, and route the generated signal or signals to the signal analyzer assembly 28.

The level of acoustic emission detected at each sensor at each of the one or more specific locations can be conditioned or filtered prior to being compared to the predetermined threshold (S126). The filtering can employ conditioning filters that remove or filter out frequency waveforms below a desired threshold, and leave waveforms having more content of interest. Thus, the signals routed to the signal analyzer can pass through filters for purposes of enhancing the acoustic emission represented by the signals prior to processing. In the system illustrated in FIG. 1, filters 46,48 can be conditioning filters that remove or filter out frequency waveforms below the desired threshold prior to the signals 16*a*,18*a* being sent to the microcomputer 34. Alternatively, other types of filters could be employed or no filters need be employed (e.g., filtering could be done by the microcomputer 34).

At the signal analyzer, the signals and the acoustic emission represented thereby are processed prior to being compared to the predetermined threshold (S128). More particularly, the signal analyzer can process the acoustic emission collected via the signals to determine or generate a value representative of the acoustic emission generated and detected at each sensor at each location of interest at any given time. Then, the value generated at any given time (or alternatively over a specific period of time) can then be compared to the predetermined threshold to determine the crack initiation status of the vehicle closure (S130). Such processing and comparing can be done through conventionally known systems and software as will be understood and appreciated by those skilled in the art and will be discussed in more detail below in reference to the exemplary system 10 of FIG. 1.

When a vehicle closure begins to fail (e.g., crack) due to fatigue, various changes occur which can affect the dynamic response of the vehicle closure. For example, an increase in high-frequency emission may be observable and/or measurable from local zones of damage to the vehicle structure. More specifically, when a crack initiates or forms in a vehicle closure, there is typically a measurable increase in the high frequency local vibration (i.e., acoustic emission) in the closure as the closure undergoes further cycles of opening and closing. In one example, this measurable increase can be caused by micro-fretting in a welded portion of the vehicle structure as a crack initiates and/or propagates due to fatigue.

In view of the foregoing, the predetermined threshold is selected to correspond to a condition in which the closure structure being monitored begins to fail due to fatigue. This may correspond to a condition of the vehicle closure wherein the crack initiation potential (i.e., the likelihood that a crack will begin forming in the next several cycles of the durability test) is high. Alternatively, the threshold may correspond to a crack initiating in the vehicle closure or to a point in time at which a crack has formed and propagated to a predetermined amount. In this instance, the predetermined threshold would function as a target and crossing the predetermined threshold would indicate that a crack has initiated (or propagated to the predetermined amount). The predetermined threshold could also be used as representative of a trend from a baseline wherein similar trending by the signals representative of the acoustic emissions of the vehicle closure is equivalent to crossing the threshold.

As already indicated, the determination that the predetermined threshold has been crossed can be used to actuate an alarm. Actuation of an alarm can be used to alert test personnel as to the condition of the vehicle closure being monitored or could be used for some other function (e.g., ending the durability test). The use of an alarm as indicating that the vehicle closure has failed due to fatigue can have the advantage of providing greater test efficiency. In particular, the alarm can automatically alert test personnel the exact moment when the vehicle closure fails, which potentially reduces the frequency of tear-downs required during durability testing of a particular vehicle closure design and better ensures that the vehicle closure is sufficiently intact (e.g., not suffering any fatal cracks) during the entirety of the durability test. Even if the alarm is not triggered until some number of cycles beyond crack initiation (e.g., the predetermined threshold is not and/or cannot be precisely correlated to crack initiation in the vehicle closure), the fatigue information obtained about the vehicle closure may be an improvement over prior art inspection techniques and frequencies (e.g., in prior art techniques a vehicle closure may be invasively checked at specific intervals regardless of the actual existence or non-existence of a crack).

In any case, comparing the value generated by the signal analyzer to the predetermined threshold (S130) can determine the crack initiation status of the vehicle closure. In its simplest form, the crack initiation status can be either "cracked" indicating that a crack has initiated in the vehicle closure or "no crack" indicating that no crack has yet initiated in the vehicle closure. However, it is contemplated that the results of the comparison could be refined to provide more specific and useful information. For example, a measurable increase in the value generated may indicate that a crack is soon to form or initiate. Also, the comparison to the predetermined threshold may indicate that the vehicle closure is expected to fail or crack within an estimated number of cycles. Further, the rate at which acoustic emissions increase or approach the predetermined threshold could yield further information concerning the crack initiation status of the vehicle closure.

Still further, comparing the acoustic emission collected to the predetermined threshold can include correlating a change in the acoustic emission versus time to a crack propagation rate in the vehicle closure being monitored. Further yet, comparing the acoustic emission collected to the predetermined threshold can include determining any one or more of the following: a timing of when the acoustic emission exceeds the predetermined threshold, a count of repeated closure impacts of the vehicle closure when the acoustic emission exceeds the predetermined threshold, which particular one or more of the locations being monitored exceeded the predetermined threshold, a rate of change of the acoustic emission versus time, and/or a rate of change of the acoustic emission versus the count of repeated closure impacts of the vehicle closure. In the system 10, the sensor 66 could be employed to provide the signal analyzer assembly 28 with signals 66a for determining the count of closures of the door 12 in a particular durability test.

In the exemplary system 10 of FIG. 1, the signals 16a,18a from the sensors 16,18 at the locations 20,22 are processed by the signal analyzer assembly 28. Such processing can include the filtering function performed by the filters 46,48 and further includes generating values that can be compared to a predetermined threshold for purposes of determining the crack initiation potential or status of the door 12. In particular, the signals 16a,18a are received by the microcomputer 34 from the filters 46,48 via the interface 36. As is known an understood by those skilled in the art, the microcomputer can use known digital signal processing methods to further filter the received signals in such a way so as to enhance the acoustic emission content of interest. This could be accomplished by the signal analyzer module 52, for example.

Next, as is also known and understood by those skilled in the art, specialized numerical methods can be used to post-process the acoustic emission represented by the signals to return specific values for comparing to the predetermined threshold. This could be accomplished by the comparator module 56, for example. The comparator module 56 can further function to compare the returned values to the predetermined threshold to determine if the acoustic emission from the door 12 crosses the predetermined threshold. Should the returned values, which represent the acoustic emission generated by each repeated closure of the vehicle door 12, exceed the predetermined threshold, the comparator module 56 can instruct the processor 40 to send signal 58a to actuate the alarm 58 via interface 38. The predetermined threshold can be set as already described herein with respect to FIGS. 2 and 3.

When desirable, the acoustic emission energy sensed by the sensors 16,18 and processed by the microcomputer 34 can be recorded. For example, the data recorder module 54 could record information related to the acoustic emission locally on the ROM 42 or could direct such recording to occur on a remote device, such as the network server 60 and/or database 62 connected to the microcomputer 34 via network 64. Alternately, or in addition, the recorder module 54 could track or record an increase or decrease in the acoustic emission at the locations 20,22 as monitored by the sensors 16,18.

Figure 4:
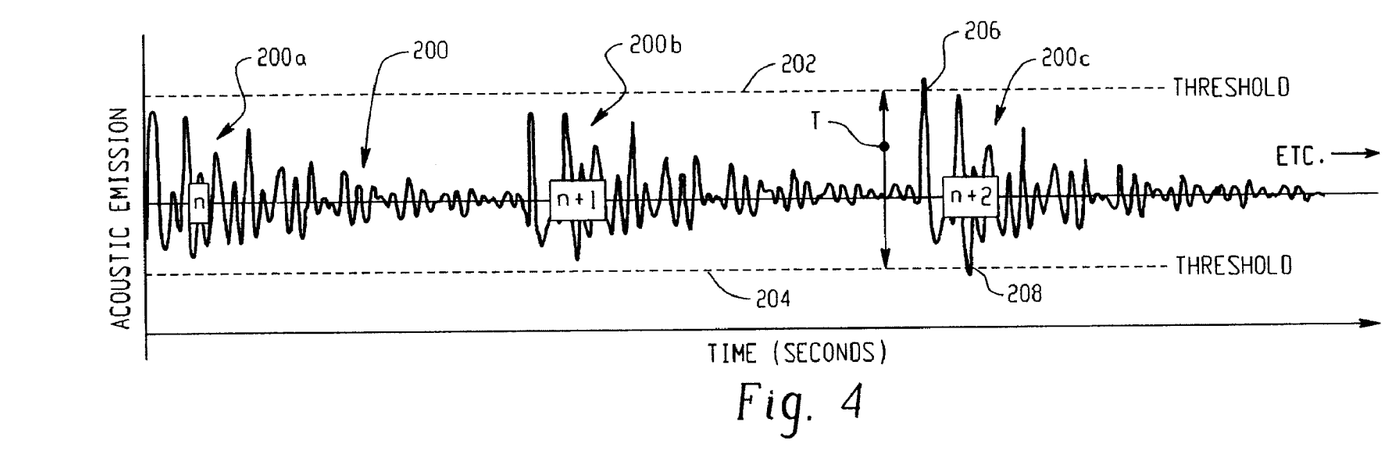
FIG. 4 is an exemplary diagram showing the acoustic emission being compared to the predetermined threshold during durability testing of the vehicle closure using a time domain method.

With reference now to FIG. 4, an exemplary comparison of generated acoustic emission to a predetermined threshold using a time domain method is illustrated for a vehicle closure undergoing durability testing. More particularly, signals from crack initiation sensors (such as signals 16a,18a from sensors 16,18) are processed and values representative of the acoustic emission sensed by the sensors are generated. The generated values from each sensor can be plotted versus time as an acoustic emission curve, such as curve 200, which depicts the acoustic emission from one particular sensor versus time. The illustrated curve 200 includes a series of three (3) sequential closures or cycles (i.e., counts) of a vehicle closure being monitored, including cycle n, cycle n+1, and cycle n+2. As shown and expected, the amplitude of curve 200 increases substantially at each time of closure or closure impact (e.g., at n, n+1 and n+2) and decreases between closures (such as during opening of the vehicle closure between closings).

In one embodiment, the predetermined threshold T is set as a fixed amplitude, such as a predetermined amount of acoustic emission, and can be illustrated graphically as a distance between two fixed threshold curves 202,204 or can simply be considered the fixed threshold curves 202,204. The generated values represented by curve 200 can be compared to the predetermined threshold T (or curves 202,204) to determine whether a crack has initiated in the vehicle closure being monitored. As illustrated, the curve portion 200a corresponds to the closure n of curve 202, the curve portion 200b corresponds to the closure n+1, and the curve portion 200c corresponds to the closure n+2. The amplitude of curve portions 200a and 200b are shown as not crossing or exceeding the predetermined threshold T, but the curve portion 200c is shown as crossing or exceeding the predetermined threshold T at 206 and 208 indicating that a crack has initiated in the vehicle closure being monitored at closure or cycle n+2.

Figure 5:
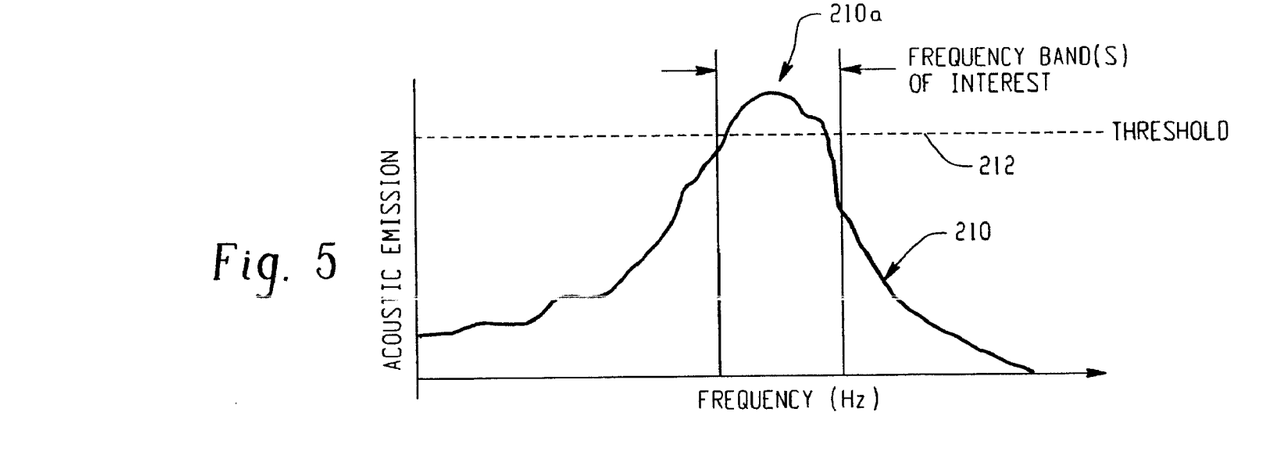
FIG. 5 is an exemplary diagram showing the acoustic emission being compared to the predetermined threshold during durability testing of the vehicle closure using a frequency domain method.

With reference to FIG. 5, an exemplary comparison of generated acoustic emission to a predetermined threshold using a frequency domain method is illustrated for a vehicle closure undergoing durability testing. In this method, signals from crack initiation sensors (such as signals 16a,18a from sensors 16,18) are processed and compared to the predetermined threshold. For example, processing of the signals received could include isolating a particular frequency band of interest and comparing it to the predetermined threshold. In FIG. 5, this is illustrated graphically by frequency versus acoustic emission curve 210 of which only portion 210a is compared to predetermined threshold 212. When the portion 210a exceeds the predetermined threshold 212, such as shown, it can be determined that a crack has initiated in the vehicle closure under investigation.

The exemplary embodiment or embodiments have been described with reference to preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for monitoring one or more specific locations of a vehicle closure of a vehicle for fatigue failure occurring during opening and closing of the vehicle closure, comprising:
    selecting a predetermined threshold corresponding to a condition in which a vehicle closure begins to fail due to fatigue;
    identifying one or more specific locations on the vehicle closure to be monitored;
    mounting a sensor at each of said one or more specific locations on said vehicle closure, wherein said sensor is a high-frequency acoustic emission sensor that is at least one of an acoustic emission accelerometer or a piezoelectric accelerometer;
    repeatedly opening and closing said vehicle closure with said sensor mounted at each of said one or more specific locations on said vehicle closure; and
    comparing acoustic emission generated during repeated opening and closing of said vehicle closure to the predetermined threshold to determine a crack initiation status of said vehicle closure.

2. The method of claim 1, wherein repeatedly opening and closing the vehicle closure and comparing said acoustic emission generated to said predetermined threshold includes:
    (i) generating said acoustic emission during each closing impact of said vehicle closure;
    (ii) detecting a level of said acoustic emission generated at said sensor at each of said one or more specific locations on said vehicle closure;
    (iii) collecting said level of acoustic emission detected at said sensor at each of said one or more specific locations on said vehicle closure;
    (iv) comparing said level at said sensor at each of said one or more specific locations to said predetermined threshold to determine said crack initiation status of said vehicle closure.

3. The method of claim 2, wherein detecting said level of said acoustic emission generated and collecting said level of acoustic emission detected includes:
    generating a signal at each sensor representative of said level of acoustic emission sensed by said sensor at each of said one or more specific locations on said vehicle closure; and
    routing said signal to a signal analyzer.

4. The method of claim 2, wherein collecting said level of acoustic emission includes:
    filtering said level of said acoustic emission at said sensor at each of said one or more specific locations on said vehicle closure prior to comparing said level to said predetermined threshold.

5. The method of claim 1, wherein comparing acoustic emission generated to a predetermined threshold includes:
    processing said acoustic emission prior to comparing said acoustic emission to said predetermined threshold to determine a value representative of said acoustic emission at said sensor at each of said one or more specific locations on said vehicle closure; and
    then comparing said value to said predetermined threshold to determine said crack initiation status of said vehicle closure.

6. The method of claim 1, wherein identifying said one or more specific locations of said vehicle closure includes completing a computer aided engineering (CAE) evaluation of said vehicle closure to identify high-risk locations thereon.

7. The method of claim 1 wherein said high-frequency acoustic emission sensor captures high frequency vibrational events in the range of about 1 KHz to about 2 MHz or greater.

8. The method of claim 1, wherein said vehicle closure is one of a vehicle door or a tailgate.

9. The method of claim 8, wherein said vehicle closure is a passenger cabin entry door and one of said one or more specific locations is a connection area of said door between a main body portion and a forward window frame portion.

10. The method of claim 1, further including issuing an alarm when said acoustic emission crosses said predetermined threshold.

11. The method of claim 1 further including recording said acoustic emission generated during repeated opening and closing of said vehicle closure.

12. A method for determining fatigue failure in a vehicle closure, comprising:
    identifying at least one high risk location in a vehicle closure;
    positioning at least one sensor on said vehicle closure at each one of said at least one high risk location;
    generating acoustic emission by repeatedly closing said vehicle closure;

collecting said acoustic emission generated for each closing impact of said vehicle closure through said at least one sensor;

comparing said acoustic emission collected to a predetermined threshold to determine a crack initiation potential of said vehicle closure; and tracking an increase or decrease in said acoustic emissions at said at least one high risk location for each closing impact.

13. The method of claim 12 further including routing said at least one sensor to a signal analyzer for processing said acoustic emission collected and generating a value representative of the acoustic emission generated at a given time that is compared to said predetermined threshold.

14. The method of claim 12, wherein each of said at least one sensor is an acoustic emission sensor.

15. The method of claim 12, wherein said acoustic emission sensor is a piezoelectric accelerometer that captures high frequency vibrational energy.

16. The method of claim 12, wherein said vehicle closure is one of a vehicle passenger cabin entry door or a tailgate, and wherein identifying said at least one high risk location includes completing a computer aided engineering evaluation of said one of said vehicle passenger cabin entry door or said tailgate.

17. The method of claim 12 further including issuing an alarm when said acoustic emission collected reaches said predetermined threshold.

18. The method of claim 12, wherein comparing said acoustic emission collected to said predetermined threshold includes determining at least one of: a timing of when said acoustic emission exceeds said predetermined threshold, a count of repeated closure impacts of said vehicle closure when said acoustic emission exceeds said predetermined threshold, which particular one or more of said at least one high risk locations of interest exceeded said predetermined threshold, a rate of change of said acoustic emission versus time, and/or a rate of change of said acoustic emission versus said count.

19. The method of claim 12, wherein comparing said acoustic emission collected to said predetermined threshold includes correlating a change in said acoustic emission versus time to a crack propagation rate in said vehicle closure.

20. A method for monitoring one or more specific locations of a vehicle closure during opening and closing of the vehicle closure, comprising:
(a) identifying one or more specific locations on a vehicle closure to be monitored;
(b) mounting a sensor at each of said one or more specific locations on said vehicle closure;
(c) repeatedly opening and closing said vehicle closure with said sensor mounted at each of said one or more specific locations on said vehicle closure; and
(d) monitoring local vibrations sensed by said sensor mounted at each of said one or more specific locations at each closure impact for a measurable increase evidencing crack initiation and/or propagation in said vehicle closure.

21. An automated crack detection system for determining a crack initiation potential of a vehicle closure, said system comprising:
a vehicle closure operatively mounted to a vehicle;
one or more sensors positioned on said vehicle closure at one or more specific locations for monitoring acoustic emissions of said vehicle closure during closure thereof; and
a signal analyzer assembly linked to each of said one or more sensors for receiving acoustic emission signals from said one or more sensors and comparing said signals received from said one or more sensors to a predetermined threshold corresponding to a condition in which said vehicle closure begins to fail to determine a crack initiation potential of said vehicle closure.

22. The system of claim 21, wherein said signal analyzer assembly compares an amplitude of said signals to said predetermined threshold to determine said crack initiation potential of said vehicle closure.

23. The system of claim 21, wherein said signal analyzer assembly includes one or more conditioning filters for filtering said signals prior to comparing said signals to said predetermined threshold.

24. The system of claim 21, wherein said signal analyzer assembly generates a FFT spectrum or time history from said signals and said FFT spectrum or time history is compared to said predetermined threshold to determine said crack initiation potential of said vehicle closure.

25. The system of claim 24 further including a data recorder for storing information related to said FFT spectrum or time history.

26. The system of claim 21 further including an alarm that is actuated when said acoustic emission signals indicate that said acoustic emissions exceed said predetermined threshold.

27. The system of claim 21, wherein said signal analyzer assembly includes:
condition monitoring hardware including a microcomputer having an interface operatively connected to said one or more sensors for receiving said acoustic emission signals therefrom and one or more conditioning filters for processing said acoustic emission signals; and
condition monitoring software run by said microcomputer, said condition monitoring software including a signal analyzer module for generating a FFT spectrum or time history from said acoustic emission signals, a data recorder module for storing information related to said FFT spectrum or time history and a comparator module for comparing said FFT spectrum or time history to said predetermined threshold.

* * * * *